(No Model.)
M. KEEHN.
SCREW DRIVER.
No. 527,696. Patented Oct. 16, 1894.
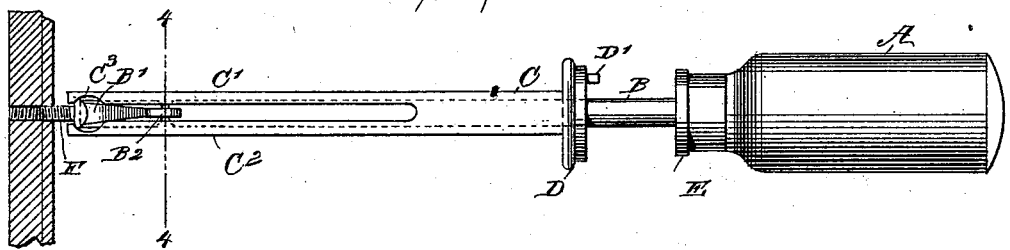
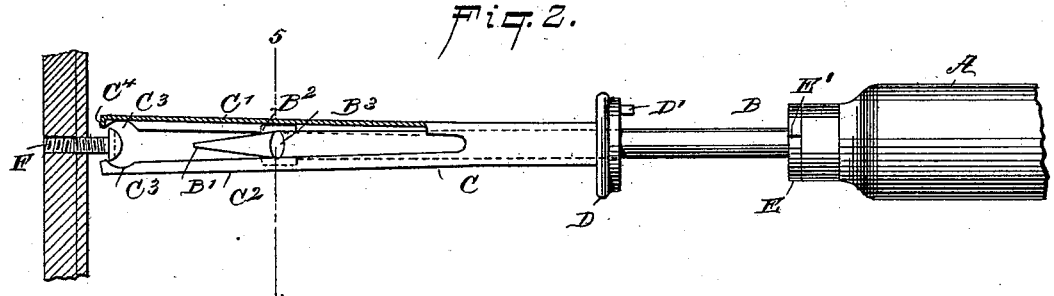
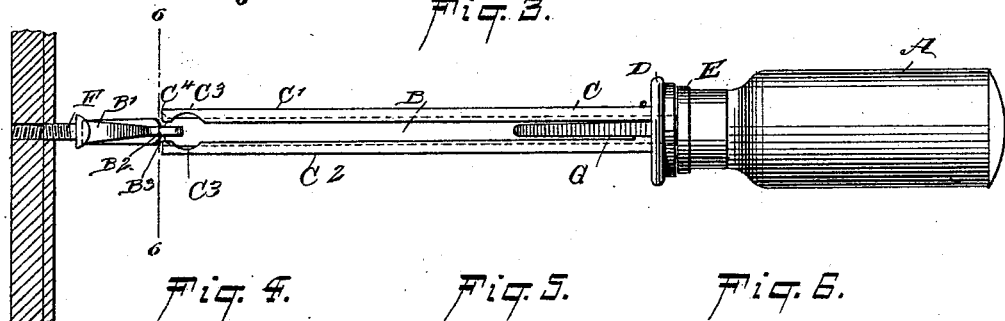
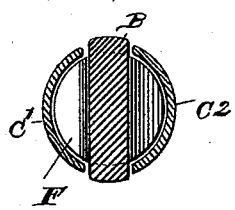
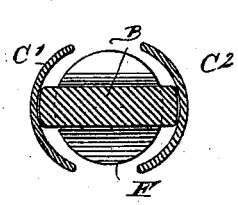
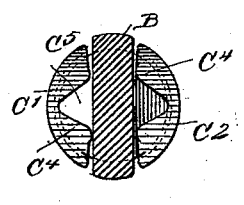
WITNESSES:
William Goebel.
INVENTOR
M. Keehn
BY Munn & Co
ATTORNEYS.

UNITED STATES PATENT OFFICE.

MAXIMILIAN KEEHN, OF NEW YORK, N. Y.

SCREW-DRIVER.

SPECIFICATION forming part of Letters Patent No. 527,696, dated October 16, 1894.

Application filed July 6, 1894. Serial No. 516,732. (No model.)

*To all whom it may concern:*

Be it known that I, MAXIMILIAN KEEHN, a subject of the Emperor of Germany, residing in New York city, in the county and State of New York, have invented a new and Improved Screw-Driver, of which the following is a full, clear, and exact description.

The object of the invention is to provide a new and improved screw driver, which is comparatively simple and durable in construction, and more especially designed for temporarily holding a screw, to properly carry the same to and engage it in the screw hole previous to screwing it home.

The invention consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1 is a side elevation of the improvement as applied. Fig. 2 is a similar view of the same, with parts in a different position. Fig. 3 is a rear elevation of the same with parts in a different position. Fig. 4 is an enlarged transverse section of the improvement, on the line 4—4 of Fig. 1. Fig. 5 is a similar view of the same, on the line 5—5 of Fig. 2; and Fig. 6 is a like view of the same, on the line 6—6 of Fig. 3.

The improved screw driver is provided with a handle A, from which extends the shank B, formed with the usual sharp end B', adapted to engage a slot in the head of the screw to be driven. On the shank B is fitted to slide a sleeve C, formed at its rear end with a head D, provided with a pin D' adapted to engage an aperture or recess E' in a disk E secured to the handle A, as plainly shown in the drawings. When the pin D' engages the said recess E', the head D is prevented from turning, and consequently a like motion of the sleeve C is prevented.

The sleeve C is formed with a longitudinally extending split, to produce the prongs C' and $C^2$, formed near their forward ends with recesses $C^3$ for the passage of the head of the screw F, to be driven, the said prongs being also provided at their extreme outer ends with inwardly projecting flanges $C^4$, which form a seat for the head of the screw, and also engaging at their opposite edges the shank of the screw, to securely hold the latter in place. The sleeve C is preferably made of spring metal, so that the prongs C' and $C^2$ can be readily spread apart, as illustrated in Fig. 2, and this is accomplished by cam lugs $B^2$, formed or secured on the shank B near the sharp end B', as illustrated in the drawings.

On the shank B next to the cam lugs $B^2$ are formed notches $B^3$, adapted to be engaged by the flanges $C^4$ at the time the sleeve C is in a rearmost position, as illustrated in Fig. 3. A spring tongue G extends into one of the splits of the sleeve C and forms part thereof, the free end of the said tongue pressing on the shank so as to prevent accidental displacement of the sleeve on the shank B.

The operation is as follows: In order to place the screw F in position, the operator moves the sleeve C a short distance outward, so that the sharpened end B' of the shank B is at the rear of the recesses $C^3$, and the cam lugs $B^2$ extend in the splits of the sleeve so that the prongs C' and $C^2$ remain in a closed position. The operator now passes the screw head in position on the front end of the sleeve C, the head passing through the recesses $C^3$, and the shank between the corresponding split until the shank of the screw is engaged by the opposite edges of the flanges $C^4$, and the under side of the head is seated on the inner faces of the said flanges. As the latter are cut out, as indicated in Fig. 6, by angular notches $C^5$, the shank of the screw is securely held in place, thus supporting the screw on the sleeve. The operator now moves the sleeve rearward so that the sharpened end B' of the shank B engages the slot in the head of the screw, and then the device, with the screw, is passed into a clock or other article, part of which is to be fastened, so that the shank of the screw engages the screw hole, and by turning the screw driver is engaged therewith. As soon as this has been done, the operator moves the handle A rearward, to withdraw the end B' of the shank B from the screw head, and at the same time turns the handle so as to engage the cam lugs $B^2$ with the inner faces of the prongs C' and C², to spread the same out, as plainly indicated in Fig. 2. The operator now, by moving the device downward, readily disengages the front ends of the prongs from the shank and head of the screw. When this has been done, the handle A is again turned, the head D being held stationary by the operator, to bring the lugs B² back into the splits of the shank, and then the sleeve is moved rearward on the shank, and the pin D' is engaged with the aperture or recess E' on the disk E, to lock the sleeve in position. The sharp end B' now projects beyond the front end of the prongs C' and C² of the sleeve, and can now again engage the slot in the head of the screw, to drive the latter home. See Fig. 3.

By the arrangement described, the operator is enabled to temporarily and conveniently support the screw to be driven so as to pass the screw into the proper position without the operator using his hands. In clocks and other machines it is frequently impossible for the operator to place the screw in position with his hands, and frequently he uses pliers or other devices for the purpose. With the screw driver described, the operator is enabled to conveniently engage the screw and drive the same home.

Having thus described my invention, I claim as new and desire to secure by Letters Patent—

1. A screw driver provided near its point with laterally extending lugs or cams, and a pair of spring prongs having jaws at their forward ends and provided at their rear ends with a sleeve sliding and turning on the screw driver, the said jaws springing toward each other when the cams or lugs lie in the plane of the slot or space which separates them and being forced apart when the sleeve is given a quarter turn to bring the lugs or cams in contact with the inner faces of the prongs and then moved forwardly on the screw driver, substantially as described.

2. A screw driver provided near its point and at right angles thereto with cams or lugs B² B² and in its other two sides with recesses B³ B³, and the sleeve C sliding and turning on the screw driver and having parallel prongs C' C² provided at their forward ends with jaws C⁴ and lateral recesses C³ and interlocking fastening devices to connect the sleeve in its rearward position with the screw driver, the said cams serving to spread the prongs apart when the sleeve is given a quarter turn and moved rearwardly on the screw driver and permitting the prongs to spring together when the lugs or cams lie in the plane of the space separating them, substantially as described.

MAXIMILIAN KEEHN.

Witnesses:
JOSEPH FLEISCHL,
ROBERT TAYLOR.